United States Patent
Ha

(10) Patent No.: US 7,123,932 B2
(45) Date of Patent: Oct. 17, 2006

(54) APPARATUS FOR STABILIZING TRANSMISSION POWER OF BROADBAND CODE DIVISION MULTIPLE ACCESS TYPE MOBILE COMMUNICATION TERMINAL

(75) Inventor: Yun-Cheol Ha, Yongin-shi (KR)

(73) Assignee: Samsung Electronics Co., Ltd., (KR)

( * ) Notice: Subject to any disclaimer, the term of this patent is extended or adjusted under 35 U.S.C. 154(b) by 562 days.

(21) Appl. No.: 10/396,553

(22) Filed: Mar. 25, 2003

(65) Prior Publication Data

US 2004/0053633 A1  Mar. 18, 2004

(30) Foreign Application Priority Data

Sep. 12, 2002  (KR) ............... 10-2002-0055448

(51) Int. Cl.
*H04B 7/00*  (2006.01)

(52) U.S. Cl. ............ 455/522; 455/69; 455/115.3; 455/126

(58) Field of Classification Search ........... 455/522, 455/550.1, 115.1, 115.3, 126, 67.11, 69, 75, 455/136, 137, 138, 341, 334

See application file for complete search history.

(56) References Cited

U.S. PATENT DOCUMENTS

| | | | | |
|---|---|---|---|---|
| 5,056,109 A | * | 10/1991 | Gilhousen et al. | 370/342 |
| 5,732,334 A | * | 3/1998 | Miyake | 455/126 |
| 6,396,879 B1 | * | 5/2002 | Yoshimura et al. | 375/297 |
| 6,591,089 B1 | * | 7/2003 | Ichihara | 455/115.3 |
| 6,970,715 B1 | * | 11/2005 | Matsunami et al. | 455/522 |
| 2004/0072548 A1 | * | 4/2004 | Kikuchi | 455/232.1 |

* cited by examiner

*Primary Examiner*—Edan Orgad
(74) *Attorney, Agent, or Firm*—Dilworth & Barrese LLP

(57) ABSTRACT

Disclosed is an apparatus for stabilizing a transmission power of a CDMA mobile communication terminal which adaptively stabilizes the transmission power according to a data rate. In case of transmitting the transmission signal having the maximum data rate with the maximum power, the variation of the transmission power is minimized by driving the stabilizing apparatus, and in other cases, the transmission power is controlled so as to keep a constant power without driving the stabilizing apparatus.

6 Claims, 2 Drawing Sheets

APPARATUS FOR STABILIZING TRANSMISSION POWER OF BROADBAND CODE DIVISION MULTIPLE ACCESS TYPE MOBILE COMMUNICATION TERMINAL

PRIORITY

This application claims priority to an application entitled "Apparatus for stabilizing transmission power of broadband code division multiple access type mobile communication terminal" filed in the Korean Industrial Property Office on Sep. 12, 2002 and assigned Ser. No. 2002-55448, the contents of which are hereby incorporated by reference.

BACKGROUND OF THE INVENTION

1. Field of the Invention

The present invention relates to a code division multiple access (CDMA) type mobile communication terminal, and more particularly to an apparatus for stabilizing a transmission power of a CDMA mobile communication terminal.

2. Description of the Related Art

In case of a CDMA type mobile communication terminal, the dynamic range of a transmission section is wide, and thus it is very difficult to implement a transmission power stabilizing circuit. This is because a transmission power detector does not have the dynamic range of about 90 dB that is required in the CDMA mobile communication terminal.

Generally, the transmission power stabilization implemented in the CDMA mobile communication terminal is performed in two ways. First is a method whereby an automatic gain controller reads an output of the transmission power detector for a period of 1.25 m, and reflects this on the transmission power. Since this method cannot perform the power stabilization when it is actually implemented, a compensation method using an average value in an RAS (Radio Frequency Analog Subsystem) table is employed. However, this compensation method using the average value in the RAS table has problems in that it greatly suffers from variations of power, cannot perform an accurate compensation according to deviations in temperature and frequency, and has a large load on a radio frequency task. Further, it can be applied only for a transmission power of about −20 dBm due to the limited dynamic range of the transmission power detector.

Second is a method that monitors in real time the output of the transmission power detector, and if the transmission power is varied from a determined power, returns the transmission power to the determined power by adjusting the gain of an automatic gain control amplifier through a feedback loop. Since this method enables a real-time process, the power stability becomes high with a rapid response. However, it also has problems in that it can be applied only for a transmission power of about −20 dBm due to the limited dynamic range of the transmission power detector.

Since the above-described two power stabilizing methods are applicable only in a state that the data rate of the transmission signal is maximum, it is difficult to apply the methods to the CDMA mobile communication terminal whose data rate is frequently changed, and thus whose detected power is also changed.

SUMMARY OF THE INVENTION

Accordingly, the present invention has been made to solve the above-mentioned problems occurring in the prior art, and an object of the present invention is to provide an apparatus for stabilizing a transmission power that can be adaptively applied according to the changing data rate.

It is another object of the present invention to provide an apparatus for stabilizing a transmission power that can reduce the power variation during the maximum power transmission with the maximum data rate.

It is still another object of the present invention to provide an apparatus for stabilizing a transmission power that can accurately control the current consumption during the maximum power transmission with the maximum data rate.

In order to accomplish these objects, there is provided an apparatus for stabilizing a transmission power of a code division multiple access mobile communication terminal, comprising an automatic gain amplifier for amplifying an inputted transmission signal with an automatic gain control value, and outputting the amplified transmission signal, a power amplifier for power-amplifying the transmission signal inputted from the automatic gain amplifier and outputting the final transmission signal, a current sensing device for detecting a consumed current during power amplification of the power amplifier and applying a sensed signal if the detected current exceeds a predetermined current value, a transmission power detector for detecting and outputting a transmission power of the final transmission signal, a switch for being switched on if the sensed signal is applied and then outputting the transmission power inputted from the transmission power detector, and a gain controller for comparing the transmission power with a reference power if the transmission power is inputted from the switch, applying the automatic gain control value in proportion to a compared value, and applying the automatic gain control value in proportion to the reference power if the transmission power is not inputted from the switch.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, the apparatus for stabilizing a transmission power of a CDMA mobile communication terminal according to preferred embodiments of the present invention will be described with reference to the accompanying drawings. In the following description of the present invention, a detailed description of known functions and configurations incorporated herein will be omitted when it may obscure the subject matter of the present invention.

The present invention adaptively stabilizes the transmission power according to the data rate. In the case of transmitting at maximum power a transmission signal having a maximum data rate, the variation of the transmission power is minimized by driving the stabilizing apparatus, and in other cases, the transmission power is controlled so as to maintain the power in proportion to the reference voltage applied from a control section without driving the stabilizing apparatus.

In the CDMA type mobile communication terminal, the current consumption of a power amplifier varies according to the data rate even in the case of transmitting data with the same power. For instance, there is a difference of about 200 mA between the consumed current of the power amplifier when power-amplifying a maximum data rate transmission signal, i.e., full data rate, and the consumed current of the power amplifier when power-amplifying the transmission signal at a half data rate during the data transmission with the maximum output.

The apparatus for stabilizing transmission power according to the present invention is constructed and operated using the above-described characteristics.

Figure 1:
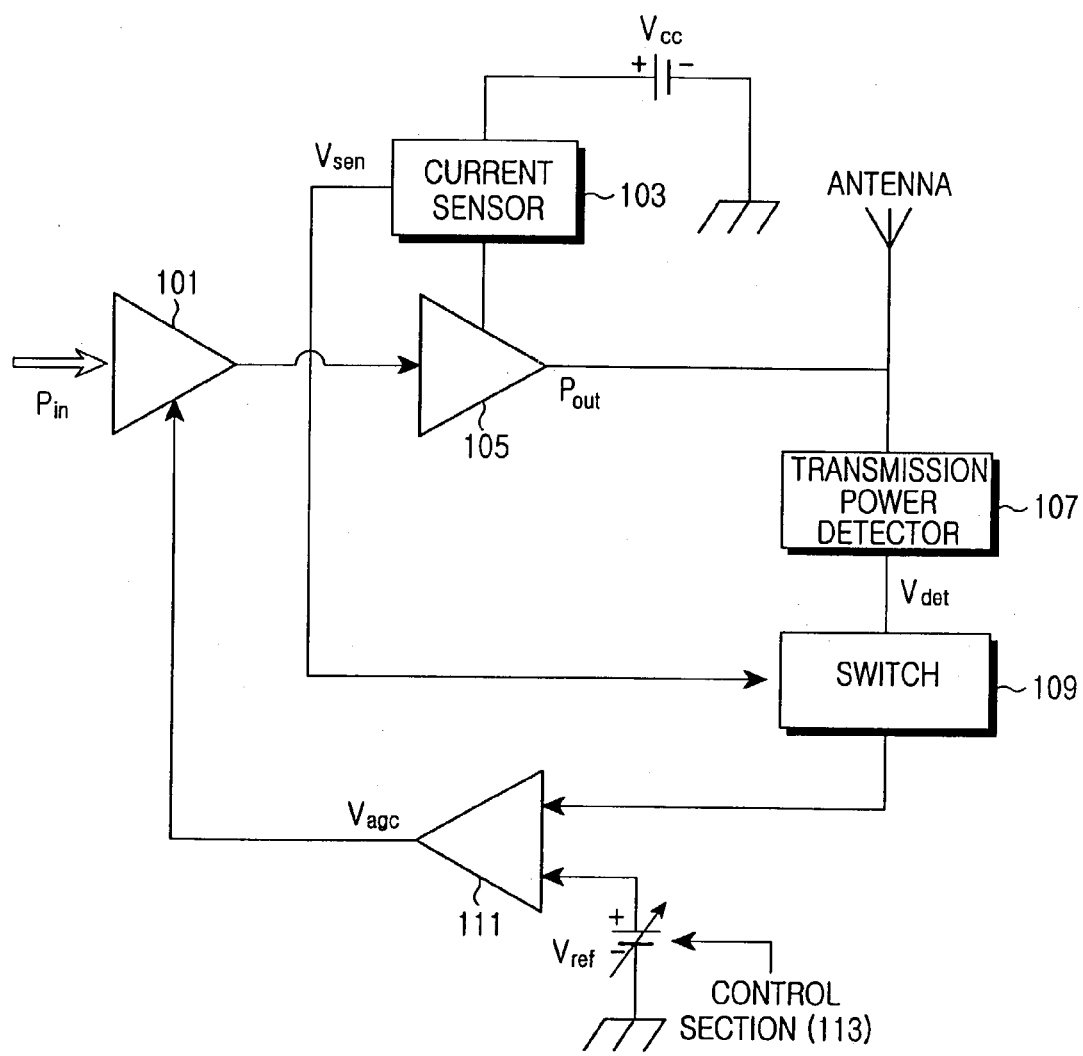
FIG. 1 is a view illustrating the construction of a transmission power stabilizing apparatus according to an embodiment of the present invention.

Now, the transmission power stabilizing apparatus according to an embodiment of the present invention will be explained with reference to FIG. 1, which shows the construction of the transmission power stabilizing apparatus according to an embodiment of the present invention. As shown in FIG. 1, the transmission power stabilizing apparatus according to an embodiment of the present invention includes an automatic gain control amplifier 101, a current sensor 103, a power amplifier 105, a transmission power detector 107, a switch 109, a gain controller 111, and a control section 113.

The automatic gain control amplifier 101 determines the gain according to an automatic gain control value Vagc applied from the gain controller 111, amplifies an inputted transmission signal Pin according to a determined gain, and outputs the amplified transmission signal to the power amplifier 105.

The power amplifier 105 power-amplifies the transmission signal inputted from the automatic gain control amplifier 101, and outputs the transmission signal Pout having the final transmission power Vdet to an antenna.

The current sensor 103 measures the current consumed in the power amplifier 105, and if the measured current exceeds a predetermined current value, applies a sensed signal Vsen to the switch 109. The predetermined current value is set based on the consumed current when the power amplifier 105 power-amplifies the transmission signal if the transmission signal having the maximum data rate is transmitted with the maximum power.

The transmission power detector 107 detects the final transmission power Vdet of the transmission signal outputted from the power amplifier 105, and outputs the detected transmission power to the switch 109.

The switch 109 is turned on if the sensed signal Vsen is applied from the current sensor 103, and outputs the final transmission power Vdet inputted from the transmission power detector 109 to the gain controller 111. If no signal is applied from the current sensor 103, the switch 109 is kept in an off state.

The control section 113 determines a proper transmission power according to a received electric field strength, and applies a reference power Vref according to the determined transmission power to the gain controller 111.

The gain controller 111 compares the final transmission power Vdet with the reference power Vref if the final transmission power Vdet is inputted from the switch 109, determines the proper automatic gain control value Vagc, and outputs the automatic gain control value to the automatic gain amplifier 101. Specifically, if the final transmission power Vdet increases, the difference between the final transmission power Vdet and the reference power Vref decreases, and this causes the gain controller 111 to output a decreasing automatic gain control value in proportion to the decreasing power difference. On the contrary, if the final transmission power Vdet decreases, the difference between the final transmission power Vdet and the reference power Vref increases, and this causes the gain controller 111 to output an increasing automatic gain control value in proportion to the increasing power difference. Also, if the final transmission power Vdet is not inputted from the switch 109, the gain controller 111 outputs to the automatic gain amplifier 101 the automatic gain control value Vagc in proportion to the reference power Vref. The operation of the power stabilizing apparatus as constructed above will now be explained. The automatic gain amplifier 101 amplifies the inputted transmission signal Pin with a gain according to the automatic gain control value Vagc, and outputs the amplified transmission signal to the power amplifier 105. The power amplifier 105 power-amplifies the transmission signal, and outputs the final transmission signal Pout. At this time, the current sensor 103 checks whether the consumed current of the power amplifier 105 exceeds a determined current value by sensing the consumed current of the power amplifier 105, and the transmission power detector 107 detects and outputs to the switch 109 the final transmission power Vdet.

The current sensor 103 applies the sensed signal Vsen to the switch 109 if the consumed current of the power amplifier 105 exceeds the determined current value, and thus the switch 109 is turned on to output the final transmission power Vdet to the gain controller 111. The fact that the consumed current exceeds the determined current value means that the present transmission signal is transmitted with the maximum power and with the maximum data rate. The gain controller 111 compares the final transmission power Vdet with the reference power Vref, and outputs the automatic gain control value Vagc in proportion to the difference between the final transmission and the reference powers to the automatic gain amplifier 101.

At this time, if the final transmission power gradually increases, the difference between the final transmission power Vdet and the reference power Vref decreases, and this causes the final transmission power Vdet to decrease. If the decreasing final transmission power Vdet is inputted to the gain controller 111 through the transmission power detector 107 and the switch 109, the difference between the reference power Vref and the final transmission power Vdet increases, the automatic gain control value Vagc increases, and this causes the final transmission power Vdet to increase.

When the transmission signal having the maximum data rate is transmitted with the maximum power according to the above-described process, power stabilization can be achieved.

If the consumed current of the power amplifier 105 detected by the current sensor 103 does not exceed the determined current value, the switch 109 is in the off state, and thus the gain controller 111 outputs the power gain control value Vagc in proportion to the reference power Vref. That is, in case of transmitting the transmission signal with a low power, the power stabilization is achieved by adjusting the power gain control value Vagc in proportion to the reference power Vref.

The operation of the power stabilizing apparatus as described above is stated in Table 1 and Table 2 below. Table 1 represents whether the sensed signal Vsen is generated during the maximum power transmission and during the normal power transmission except for the maximum power transmission, the state of the switch, and the corresponding gain control value Vagc. Table 2 represents the compared value of the final transmission power Vdet and the reference power Vref and the gain control value Vagc according to the increase/decrease of the final transmission power Vdet during the maximum power transmission.

TABLE 1

|  | Vsen | Switch | Vagc |
|---|---|---|---|
| Maximum Power Transmission | Generated | On | Proportion to Compared Value of Vdet and Vref |
| Normal Power Transmission |  | Off | Proportion to Vref |

TABLE 2

| Vdet | Compared Value of Vdet and Vref | Vagc |
|---|---|---|
| Increase | Decrease | Decrease |
| Decrease | Increase | Increase |

Figure 2:
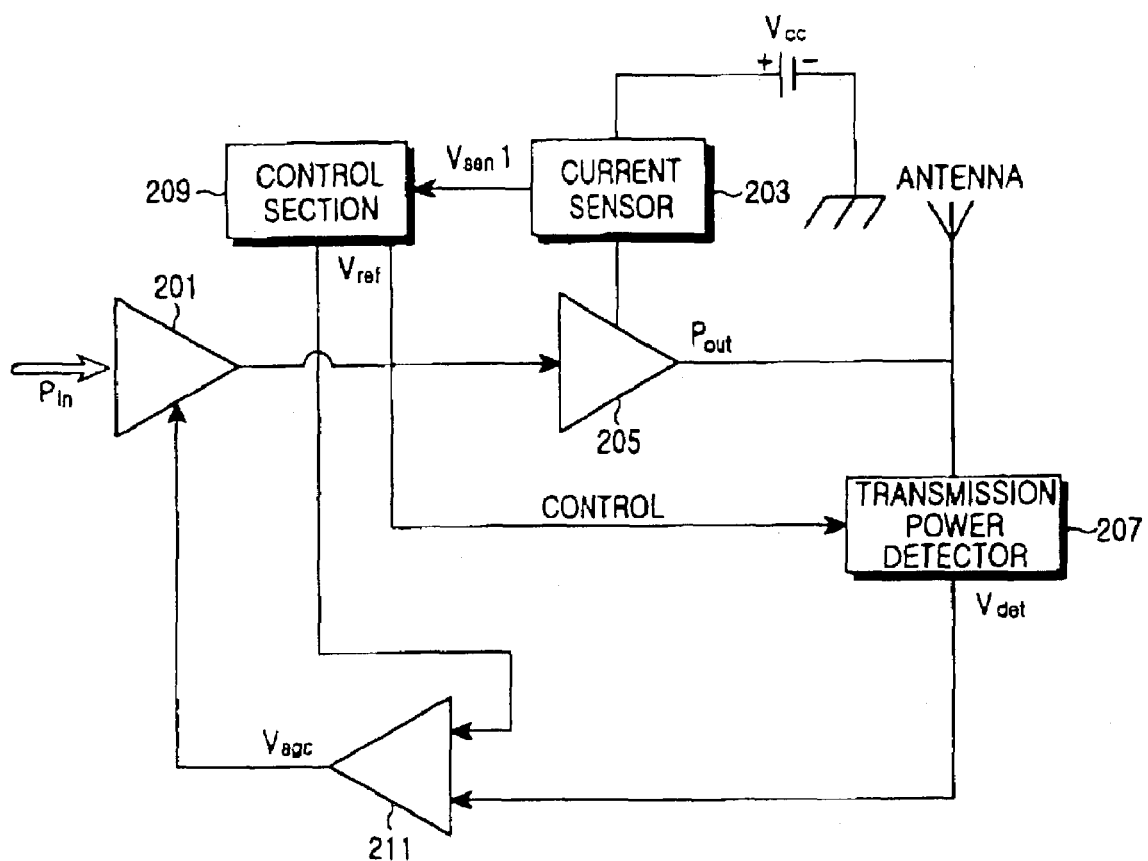
FIG. 2 is a view illustrating the construction of a transmission power stabilizing apparatus according to another embodiment of the present invention.

Next, the transmission power stabilizing apparatus according to another embodiment of the present invention will be explained. FIG. 2 is a view illustrating the construction of a transmission power stabilizing apparatus according to another embodiment of the present invention. As shown in FIG. 2, the transmission power stabilizing apparatus according to another embodiment of the present invention includes an automatic gain control amplifier 201, a current sensor 203, a power amplifier 205, a transmission power detector 207, a control section 209, and a gain controller 211.

The automatic gain control amplifier 201 determines the gain according to the automatic gain control value Vagc applied from the gain controller 211, amplifies the inputted transmission signal Pin according to the determined gain, and outputs the amplified transmission signal to the power amplifier 205.

The power amplifier 205 power-amplifies the transmission signal inputted from the automatic gain control amplifier 201, and outputs the transmission signal Pout having the final transmission power Vdet to the antenna.

The current sensor 203 measures the current consumed in the power amplifier 205, and if the measured current exceeds the predetermined current value, applies the sensed signal Vsen to the control section 209. The predetermined current value is set based on the current consumed when the power amplifier 205 power-amplifies the transmission signal in the case where the transmission signal having the maximum data rate is transmitted with the maximum power.

The transmission power detector 207 detects the final transmission power Vdet of the transmission signal Pout outputted from the power amplifier 205 under the control of the control section 209, and outputs the detected final transmission power Vdet to the gain controller 211.

The control section 209 determines the proper transmission power according to the received electric field strength, and applies the reference power Vref according to the determined transmission power to the gain controller 211. Also, if the sensed signal Vsenl is inputted from the current sensor 203, the control section 209 controls the transmission power detector 207 to output the final transmission power Vdet.

The gain controller 211 compares the final transmission power Vdet with the reference power Vref if the final transmission power Vdet is inputted from the transmission power detector 207, determines the proper automatic gain control value Vagc, and outputs the automatic gain control value to the automatic gain amplifier 201. Specifically, if the final transmission power Vdet increases, the difference between the final transmission power Vdet and the reference power Vref decreases, and this causes the gain controller 211 to output the decreasing automatic gain control value Vagc in proportion to the decreasing power difference. In contrast, if the final transmission power Vdet decreases, the difference between the final transmission power Vdet and the reference power Vref increases, and this causes the gain controller 211 to output the increasing automatic gain control value Vagc in proportion to the increasing power difference. Also, if the final transmission power Vdet is not inputted from the transmission power detector 207, the gain controller 211 outputs the automatic gain control value Vagc in proportion to the reference power Vref to the automatic gain amplifier 201.

The operation of the power stabilizing apparatus as constructed above will now be explained. The automatic gain amplifier 201 amplifies the inputted transmission signal Pin with a gain according to the automatic gain control value Vagc, and outputs the amplified transmission signal to the power amplifier 205. The power amplifier 205 power-amplifies the transmission signal, and output the final transmission signal Pout. At this time, the current sensor 203 checks whether the consumed current of the power amplifier 205 exceeds a determined current value by sensing the consumed current of the power amplifier 205, and the transmission power detector 207 detects and outputs to the control section 209 the final transmission power Vdet.

The current sensor 203 applies the sensed signal Vsen to the control section 209 if the consumed current of the power amplifier 205 exceeds the determined current value, and thus the control section 209 controls the transmission power detector 207 to output the final transmission power Vdet. The fact that the consumed current exceeds the determined current value means that the present transmission signal is transmitted with the maximum power and with the maximum data rate. The gain controller 211 compares the final transmission power Vdet with the reference power Vref, and outputs the automatic gain control value Vagc in proportion to the difference between the final transmission and the reference powers to the automatic gain amplifier 201.

At this time, if the final transmission power gradually increases, the difference between the final transmission power Vdet and the reference power Vref decreases, and this causes the automatic gain control value Vagc to decrease. As a result, the final transmission power Vdet decreases. If the decreasing final transmission power Vdet is inputted to the gain controller 211 through the transmission power detector 207, the difference between the reference power Vref and the final transmission power Vdet increases, the automatic gain control value Vagc increases, and this causes the automatic gain control value Vagc to increases. As a result, the final transmission power Vdet increases.

When the transmission signal having the maximum data rate is transmitted with the maximum power according to the above-described process, power stabilization can be achieved.

If the consumed current of the power amplifier 205 detected by the current sensor 203 does not exceed the determined current value, the sensed signal Vsen is not applied to the control section 209, and the control section 209 does not drive the transmission power detector 207. Accordingly, the gain controller 211 output the power gain control value Vagc in proportion to the reference power Vref. That is, when the transmission signal is transmitted with a low power, power stabilization is achieved by adjusting the power gain control value Vagc in proportion to the reference power Vref.

The operation of the power stabilizing apparatus as described above is stated in Table 3 below. Table 3 represents whether the sensed signal Vsen is generated during the maximum power transmission and during the normal power transmission except for the maximum power transmission, the operational state of the transmission power detector, and the gain control value Vagc. At this time, the compared value of the final transmission power Vdet and the reference power Vref and the gain control value Vagc according to the increase/decrease of the final transmission power Vdet during the maximum power transmission are the same as the values represented in Table 2.

TABLE 3

| | Vsen | Detector | Vagc |
|---|---|---|---|
| Maximum Power Transmission | Generated | Output Of Vdet | Proportion to Compared Value of Vdet and Vref |
| Normal Power Transmission | | | Proportion to Vref |

As described above, the transmission power stabilizing apparatus according to the present invention can be adaptively applied according to the data rate being changed, and reduce the power variation during the transmission of the maximum power transmission signal with the maximum data rate. Also, the apparatus can accurately control the current consumption during the maximum power transmission with the maximum data rate.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for stabilizing a transmission power of a code division multiple access mobile communication terminal, comprising:
    a control section for determining a transmission power according to a received electric field strength, and outputting a reference power according to the determined transmission power;
    an automatic gain amplifier for amplifying an inputted transmission signal with an automatic gain control value, and outputting the amplified transmission signal;
    a power amplifier for power-amplifying the transmission signal inputted from the automatic gain amplifier, and outputting a final transmission signal;
    a current sensing device for detecting a consumed current during power amplification of the power amplifier, and outputting a sensed signal if the detected current exceeds a predetermined current value;
    a transmission power detector for detecting and outputting a transmission power of the final transmission signal;
    a switch receiving the transmission power and outputting the transmission power inputted from the transmission power detector if the sensed signal is output from the current sensing device; and
    a gain controller for comparing the transmission power with the reference power inputted from the control section and generating the automatic gain control value in proportion to a compared value if the transmission power is inputted from the switch, and applying the automatic gain control value in proportion to the reference power if the transmission power is not inputted from the switch.

2. The apparatus as claimed in claim 1, wherein the predetermined current value is determined based on the consumed current value of the power amplifier when a transmission signal having a maximum data rate is transmitted with a maximum transmission power.

3. The apparatus as claimed in claim 1, wherein the gain controller varies the automatic gain control value according to a variation of a difference value between the reference power inputted from the control section and the transmission power by comparing the two powers when the transmission power is inputted from the transmission power detector.

4. An apparatus for stabilizing a transmission power of a code division multiple access mobile communication terminal, comprising:
    an automatic gain amplifier for amplifying an inputted transmission signal with an automatic gain control value, and outputting the amplified transmission signal;
    a power amplifier for power-amplifying the transmission signal inputted from the automatic gain amplifier, and outputting a final transmission signal;
    a current sensing device for detecting a consumed current during power amplification of the power amplifier, and outputting a sensed signal if the detected current exceeds a predetermined current value;
    a control section for determining a transmission power according to a received electric field strength, and outputting a reference power according to the determined transmission power;
    a transmission power detector for detecting and outputting control section under the control of the transmission power of the final transmission signal the transmission power detector being operated by the control section when the sensed signal is inputted; and
    a gain controller for comparing the transmission power with the reference power inputted from the control section and generating the automatic gain control value in proportion to a compared value if the transmission power is inputted from the transmission power detector, and applying the automatic gain control value in proportion to the reference power if the transmission power is not inputted from the transmission power detector.

5. The apparatus as claimed in claim 4, wherein the predetermined current value is determined based on the consumed current value of the power amplifier when the transmission signal having a maximum data rate is transmitted with a maximum transmission power.

6. The apparatus as claimed in claim 4, wherein the gain controller varies the automatic gain control value according to a variation of a difference value between the reference power inputted from the control section and the transmission power by comparing the two powers when the transmission power is inputted from the transmission power detector.

* * * * *